United States Patent [19]
Sakamoto

[11] Patent Number: 5,893,651
[45] Date of Patent: Apr. 13, 1999

[54] CAMERA SYSTEM AND CAMERA LENS CONTROL UNIT

[75] Inventor: Hiroyuki Sakamoto, Kanagawa, Japan

[73] Assignee: Sony Corporation, Tokyo, Japan

[21] Appl. No.: 08/989,767

[22] Filed: Dec. 12, 1997

[30] Foreign Application Priority Data

Dec. 24, 1996 [JP] Japan ................. 8-344243

[51] Int. Cl.$^6$ ................. G03B 3/10; G03B 7/00
[52] U.S. Cl. .................. 396/86; 396/131; 396/260; 348/357; 348/358; 348/362
[58] Field of Search ............... 396/85, 86, 87, 396/131, 260, 259, 529, 505, 508; 348/357, 358, 362, 211

[56] References Cited

U.S. PATENT DOCUMENTS

| | | | |
|---|---|---|---|
| 4,417,280 | 11/1983 | Yokoyama et al. | 348/357 |
| 5,028,945 | 7/1991 | Kashihara et al. | 396/86 |
| 5,057,927 | 10/1991 | Hieda | 348/362 |
| 5,463,442 | 10/1995 | Harigaya et al. | 396/85 |
| 5,633,680 | 5/1997 | Kaneko et al. | 348/357 |

*Primary Examiner*—W. B. Perkey
*Attorney, Agent, or Firm*—Jay H. Maioli

[57] ABSTRACT

In order to connect a stepping motor driven type camera unit to a camera control unit intended for a DC motor driven type camera apparatus, a camera system includes a lens block provided with a stepping motor for adjusting lens operation, an A/D conversion block for converting a DC control signal ranging from positive to negative polarity into a digital signal to be outputted, a shift direction/velocity calculation block which generates and outputs data on lens shift direction and velocity according to the digital signal from the A/D conversion block, and a pulse signal generation block for outputting a pulse signal according to the data from the shift direction/velocity calculation block.

16 Claims, 9 Drawing Sheets

CAMERA SYSTEM AND CAMERA LENS CONTROL UNIT

BACKGROUND OF THE INVENTION

1. Field of the Invention

The present invention relates to a camera apparatus and lens control interface apparatus and more particularly, to a camera apparatus and a lens control interface unit to be connected to a control unit used for a DC motor-type lens unit and capable of operating a lens mechanism provided with a pulse signal drive motor.

2. Description of the Prior Art

Conventionally, a DC motor has been used in a camera apparatus having a zoom lens mechanism such as a video camera for controlling zoom, focus, iris and the like. Such a camera apparatus has been widely used in an image pickup system for monitoring, for example, in a bank, shop, parking area, and the like. Hereinafter, an explanation will be given of an image pickup system using a conventional camera apparatus with reference to FIG. 1 and FIG. 2.

Figure 1:
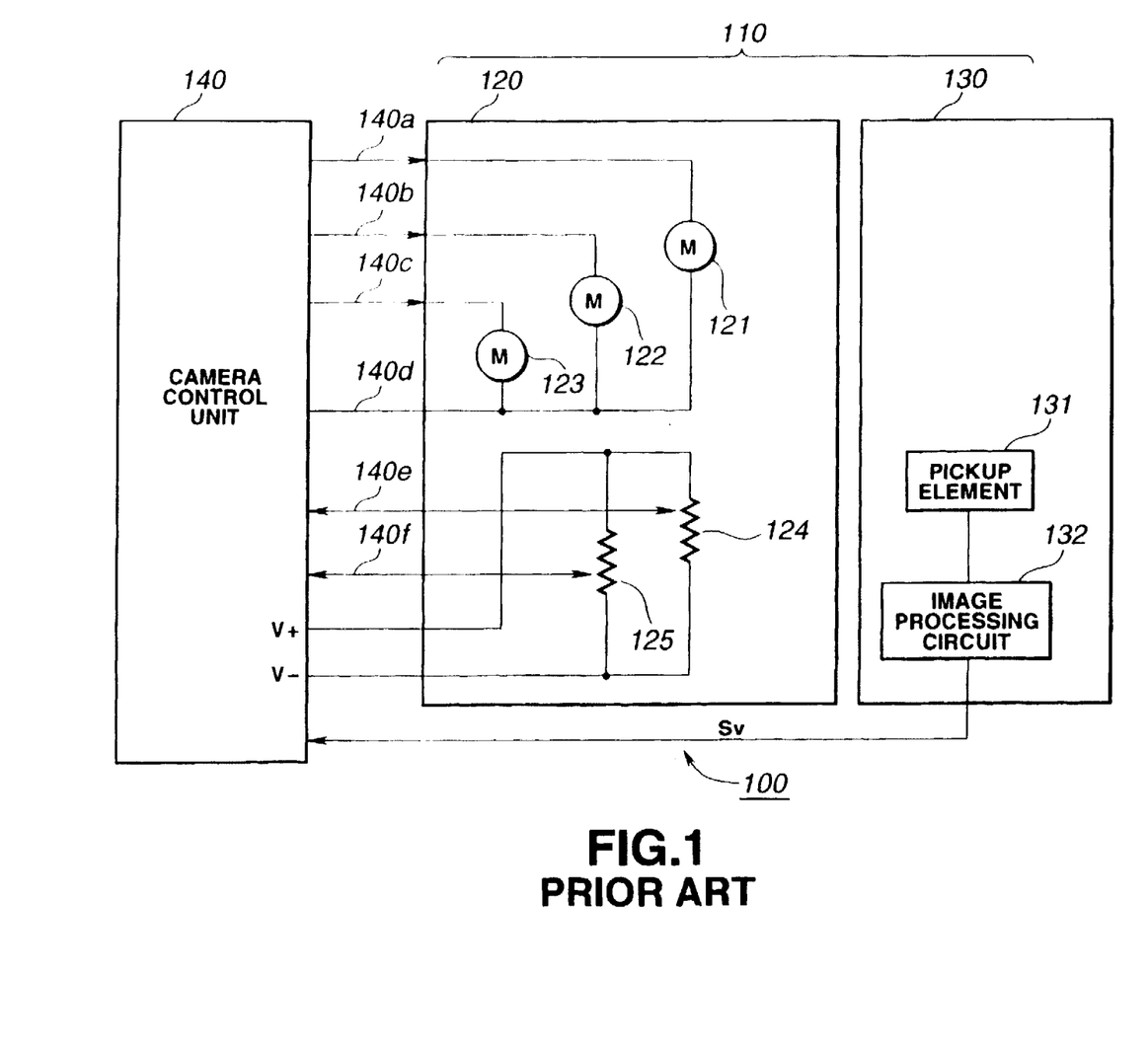
FIG. 1 is a block diagram showing an entire image pickup system in which a conventional camera apparatus is used.

As shown in FIG. 1, a conventional image pickup system 100 includes: a camera unit 110 consisting of a zoom lens block 120 having a zoom lens (not depicted) operated by a DC motor and a pickup signal generation block 130 having an image pickup element 131 and an image processing circuit 132; and a camera control unit 140 for controlling the zoom lens block 120 of this camera unit 110. In this conventional image pickup system 100, the zoom lens of the camera unit 110 is remote controlled from the camera control unit 140 for zooming, focusing, and iris operation as well as zoom and focus preset operation.

The camera unit 110 is installed, for example, at a predetermined position for monitoring clients of a bank. In the camera unit 110, an image pickup light from the zoom lens arranged in this zoom lens block 120 is received by an image pickup element 131 such as a CCD arranged in the pickup signal generation block 130, whose output is supplied to the image processing circuit 132, which in turn generates a pickup signal.

The pickup signal is supplied via a coaxial cable or the like to the camera control unit 140. The camera control unit 140 can control the display of a monitor image on a image display unit (not depicted) and the recording of a pickup signal on a VTR apparatus.

The zoom lens block 120 of the camera unit 110 includes the aforementioned zoom lens, a zoom position adjustment mechanism (not depicted) for adjusting a zoom position, and a zoom DC motor 121 which is connected to this zoom position adjustment mechanism. The zoom DC motor 121 is connected to a zoom DC motor drive circuit 143 of the camera control unit 140, so as to be operated by a zoom DC motor drive voltage signal 140a outputted from this drive circuit 143.

Moreover, the zoom lens block 120 includes a focus position adjustment mechanism (not depicted) for adjusting a focus position of the aforementioned zoom lens and a focus DC motor 122 connected to this focus position adjustment mechanism. This focus DC motor 122 is connected to a focus DC motor drive circuit 144 of the camera control unit 140 which will be explained later, so as to be operated by a focus DC motor drive voltage signal 140b outputted from this drive circuit 144.

Furthermore, the zoom lens block 120 includes an iris position adjustment mechanism (not depicted) for adjusting an iris amount (stop amount) of the aforementioned zoom lens and an iris DC motor 123 connected to this iris position adjustment mechanism. This iris DC motor 123 is connected to an iris DC motor drive circuit 145 of the camera control unit 140, so as to be operated by an iris DC motor drive voltage signal 140c outputted from this drive circuit 145.

Still further, the zoom lens block 120 includes a zoom position detecting rheostat 124 which is interlocked to be slided with a zoom position adjustment operation of the aforementioned zoom position adjustment mechanism and a focus position detecting rheostat 125 which is interlocked to be slided with a focus position adjustment operation of the aforementioned focus position adjustment mechanism.

Figure 2:
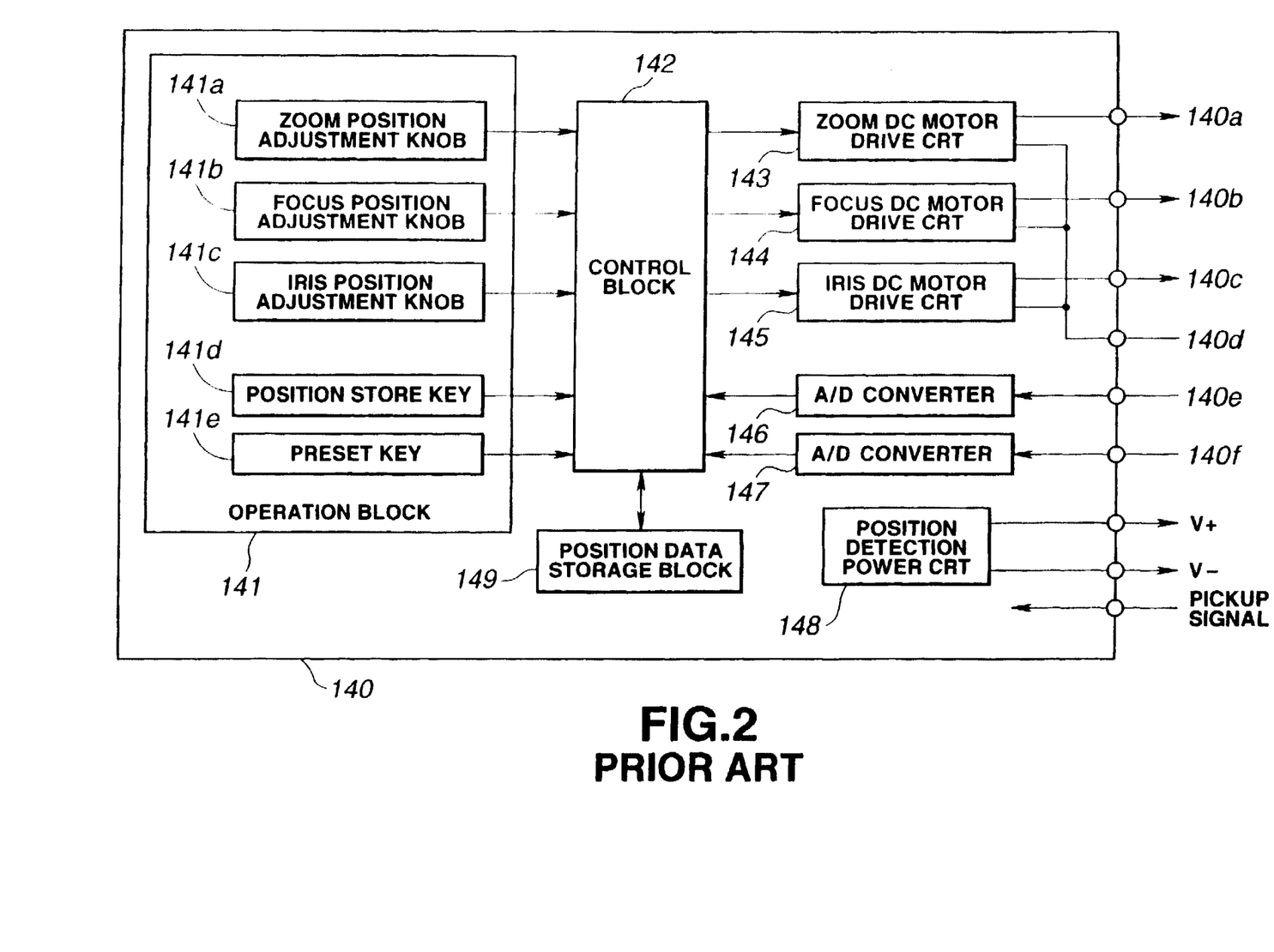
FIG. 2 is a block diagram showing a conventional camera control unit.

On the other hand, the camera control unit 140 includes, as shown in FIG. 2: an operation section 141, a control section 142, a zoom DC motor drive circuit 143, a focus DC motor drive circuit 144, an iris DC motor drive circuit 145, an A/D converter 146, 147, a position detecting power circuit 148, and a position data storage section 149. This camera control unit 140 is installed, for example, in a building manager room which is separated from the location of the aforementioned camera unit 110.

The operation section of the camera control unit 140 is provided with a zoom position adjustment knob 141a, a focus position adjustment knob 141b, an iris position adjustment knob 141c, a position store key 141d, and a preset key 141e. These adjustment knobs 141a, 141b, and 141c, and the keys 141d and 141e are respectively connected to the control section 142. The operation section 141 is formed, for example, on an operation panel arranged in the aforementioned building manager room so that the adjustment knobs and keys can be operated by the manager or the like.

The control section 142 controls the aforementioned DC motor drive circuits 143, 144, and 145 according to the operations of the aforementioned adjustment knobs 141a, 141b, and 141c of the operation section 141.

That is, when the zoom position adjustment knob 141a is operated, the control section 142 makes the zoom DC motor drive circuit 143 output a zoom DC motor drive voltage signal 140a.

Moreover, when the focus position adjustment knob 141b is operated, the control section 142 makes the focus DC motor drive circuit 144 output a focus DC motor drive voltage signal 140b.

Furthermore, when the iris control adjustment knob 141c is operated, the control section 142 makes the iris DC motor drive circuit 145 output an iris DC motor drive voltage signal 140c.

Here, the aforementioned DC motor drive voltage signals 140a, 140b, and 140c outputted from the aforementioned DC motor drive circuits 143, 144, and 145, respectively are DC currents of positive or negative polarity within a range of ±12 volts so that respective voltage values to be applied to the corresponding DC motors can be varied in this range of ±12 volts.

When the zoom position adjustment knob 141a is operated so as to request for the zoom position in the TELE direction, the control section 142 controls so that the zoom DC motor drive circuit 143 outputs a zoom DC motor drive voltage signal 140a of positive or negative polarity. On the other hand, when the zoom position adjustment knob 141a is operated so as to request for the zoom position in the WIDE direction, the control section 142 controls so that the zoom DC motor drive circuit 143 outputs a DC motor drive voltage signal 140a of negative or positive polarity.

Moreover, when the zoom position adjustment knob 141a is operated by a large value in the TELE or WIDE direction, the control section 142 controls so as to increase the voltage of the zoom DC motor drive voltage signal 140a outputted from the zoom DC motor drive circuit 143.

It should be noted that when the focus position adjustment knob 141b or the iris position adjustment knob 141c is operated for changing the focus position or the iris position, the controls section 142 similarly control the focus DC motor drive circuit 144 or the iris DC motor drive circuit 145 so as to output a focus DC motor drive voltage signal 140b or an iris DC motor drive voltage signal of positive or negative polarity.

In the camera unit 110 shown in FIG. 1, the respective DC motors 121, 122, and 123 arranged in the zoom lens block 120 are operated according to the corresponding DC motor drive voltage signals 140a, 140b, and 140c which have been outputted as described above. For example, the zoom DC motor 121 is controlled to rotate in a direction according to the polarity of the aforementioned zoom DC motor drive voltage signal 140a and to increase its rotation speed as the voltage increases.

Consequently, in the camera unit 110, a zoom operation is carried out in the TELE or WIDE direction according to the polarity of the zoom DC motor drive voltage signal 140a, whereas the zoom position shifting speed is changed according to an increase and a decrease of a voltage of the zoom DC motor drive voltage signal 140a.

Furthermore, in the conventional image pickup system 100, the position detecting power circuit 148 in the pickup camera control unit 140 outputs a position detection DC voltage V+, V− to the zoom lens block 120 of the camera unit 110. These position detection DC voltages V+, V− are supplied, as shown in FIG. 1, to both ends of the zoom position detection rheostat 124 and the focus position detecting rheostat 125 which are connected in parallel in the zoom lens block 120.

The zoom position detecting rheostat 124 outputs a voltage (voltage divided by the rheostat) corresponding to the zoom position as a zoom position voltage signal 140e to the A/D converter 146 of the camera control unit 140. This zoom position voltage signal 140e is, as shown in FIG. 2, converted from AC to DC by the A/D converter 146 and supplied as zoom position voltage data to the control section 142.

On the other hand, the focus position detecting rheostat 125 outputs a voltage (voltage divided by the rheostat) corresponding to a focus position as a focus position voltage signal 140f to the A/D converter 147 of the camera control unit 140. This focus position voltage signal 140f is converted from AC to DC by the A/D converter and supplied as focus position voltage data to the control section 142.

The control section 142 stores the aforementioned zoom position voltage data and the focus position voltage data in the position data storage section 149 according to the operation of the position store key 141d. When the preset key 141e is operated so as to request for preset which controls the zoom position adjusting mechanism and the focus position adjusting mechanism of the camera unit 110 to be positioned at the stored zoom position and the stored focus position, the control section 142 reads out the zoom position voltage data and the focus position voltage data from the position data storage section 149 and changes the voltage values of the zoom DC motor drive voltage signal 140a and the focus DC motor drive voltage signal 140b, so that zoom position voltage data and focus position voltage data are respectively identical to the zoom position voltage data and the focus position voltage data which have been read out from the position data storage section 149, thus adjusting the zoom position and the focus position to be set at the preset zoom position and the preset focus position.

Moreover, the conventional image pickup system is provided with a serial communication such as RS-232C for data communication with a system controller (not depicted). In such a conventional image pickup system, the zoom position, focus position, and iris position are controlled according to zoom position instruction data, focus position instruction data, iris position instruction data, zoom position and focus position storage request data, and preset request data which are supplied from the system controller.

In such an image pickup system, a single system controller is connected to a plurality of camera control units 140, enabling the control at a single center of a plurality of camera units 110 installed in a plurality of locations within an area to be monitored.

Recently, in contrast to the aforementioned conventional camera unit 110, there has been utilized a stepping motor driven camera apparatus in which zooming, focusing, and iris adjustment of the zoom lens is carried out by driving a stepping motor. The zoom lens used in such a camera apparatus costs less and has a smaller size than the zoom lens used in the conventional DC motor driven type camera unit 110. For example, such a lens has begun to be used as a built-in component in a monitor video camera, for example.

However, in such a stepping motor driven type camera apparatus, the aforementioned stepping motor is normally driven by a pulse signal generated by a microcomputer built in the apparatus, and has a control system different from the aforementioned DC current driven type camera unit 110. Consequently, in the conventional image pickup system 100, it is impossible to directly connect a stepping motor driven type camera apparatus to the camera control unit 140 intended for the DC motor driven type camera unit 110.

For this, in order to replace the camera unit 110 of the DC motor drive type in the existing image pickup system 100 with a stepping motor drive type camera apparatus, it is necessary to replace the camera control unit 140 and the aforementioned system controller, which brings about a problem requiring a large cost and engineering work. From the viewpoint of utilizing the existing facility, it has been desired to connect a stepping motor drive type camera apparatus to the camera control unit 140 intended for the conventional DC motor driven camera unit 110.

SUMMARY OF THE INVENTION

It is therefore an object of the present invention to provide a stepping motor driven type camera system which enables a camera control unit intended for a DC motor driven camera unit to be utilized.

Another object of the present invention is to provide a camera lens block control unit which enables a camera control unit for a DC motor driven type camera apparatus to be connected to a stepping motor driven type camera apparatus.

The camera system according to the present invention comprises: a lens block having a stepping motor which is supplied with a pulse signal and is controlled according to a pulse width of the pulse signal for adjusting internal operation in the lens block; signal level conversion means for converting a signal level of a DC analog control signal ranging from positive polarity to negative polarity into a predetermined range of signal level; A/D conversion means for converting into a digital signal the analog signal of the predetermined signal level from the signal level conversion means; a control data calculation block for generating and outputting a control data on a control direction and a control velocity of the internal operation in the lens block according to the digital signal from the A/D conversion means; and pulse signal generation means for generating the pulse signal having a pulse width determined according to the control data from the control data calculation block, for supply to the lens block.

Moreover, the camera lens block control unit according to the present invention is for controlling a lens block having a stepping motor supplied with a pulse signal for adjusting internal operation according to a pulse width of the pulse signal, and comprises: A/D conversion means for converting an analog input signal of a predetermined signal level range into a digital signal; control data detection block for outputting a control data on a control direction and a control velocity of the internal operation of the lens block, according to the digital signal from the A/D conversion means; pulse signal generation means for generating the pulse signal having a pulse width determined according to the control data from the control data detection block; and signal level conversion means for converting a signal level of the analog control signal so that a signal level range of a DC analog control signal ranging from the positive polarity to the negative polarity within the predetermined signal level range; an output of the signal level conversion means being supplied to the A/D conversion means.

DETAILED DESCRIPTION OF THE PREFERRED EMBODIMENTS

Description will now be directed to preferred embodiments of the present invention with reference to the attached drawings. A camera apparatus 3 according to a first embodiment is a video camera having a built-in zoom lens using a stepping motor driven by a pulse signal, and having a configuration as shown in FIG. 1, in which a zoom lens control interface 4 and a camera body 5 electrically connected to this zoom lens control interface 4 are constructed as a unitary block, which is preferably used, for example, in guard duty. According to this embodiment, an image pickup system 1 is made up by connecting the camera apparatus 3 via a cable or the like to a conventional camera control unit 140 shown in FIG. 1 and FIG. 2.

In this camera apparatus 3, a DC signal for driving a DC motor supplied from a conventional camera control unit 140 is converted into a pulse signal by the zoom lens control interface 4, and this pulse signal is used for zoom, focus, and iris operations for a zoom lens (not depicted). Moreover, in this camera apparatus when connected to the conventional camera control unit 140, preset operations for zoom and focus of the zoom lens are carried out according to a position detection voltage V+, V– supplied from a position detection power circuit 148 of this camera control unit 140.

Here, the camera apparatus 3 has a camera body 5 including: the aforementioned zoom lens; a zoom operation mechanism 51, a focus operation mechanism 52, and an iris operation mechanism 53 for carrying out zoom operation, focus operation, and iris operation of the zoom lens, respectively; and a zoom position detection block 54 and a focus position detection block 55 for detecting a zoom position and a focus position of the zoom lens, respectively. Moreover, the camera body 5 includes an image pickup element such as a CCD (not depicted) and an image processing circuit (not depicted) for processing an image detected by this image pickup element.

On the other hand, the zoom lens control interface 4 of the camera apparatus 3, as shown in FIG. 1, includes: a zoom control A/D conversion block 41, a focus control A/D conversion block 42, and an iris control A/D conversion block 43 which are connected to the camera control unit 140; a shift direction/velocity calculation block 44 connected to these conversion blocks 41 to 43; a pulse signal generation block 45 connected to this shift direction/velocity calculation block 44 for outputting a pulse signal to each of the zoom operation mechanism 51, the focus operation mechanism 52, and the iris operation mechanism 53 of the camera body 5; a pulse width modulation block 46; a zoom position voltage supply block 47; and a focus position voltage supply block 48.

The zoom operation mechanism 51 of the camera body 5 is provided with a zoom drive stepping motor (not depicted) which is rotated by a predetermined rotation angle according to a zoom drive pulse signal 51a supplied from the zoom lens control interface 4 and a zoom position adjustment mechanism (not depicted) for adjusting a zoom position of the zoom lens according to the rotation output of this zoom drive stepping motor.

The focus operation mechanism 52 is provided with a focus drive stepping motor (not depicted) which is rotated by a predetermined rotation angle according to a zoom drive pulse signal 52a supplied from the zoom lens control interface 4 and a focus position adjustment mechanism (not depicted) for adjusting a focus position according to the rotation output of this focus drive stepping motor.

The iris operation mechanism 53 is provided with an iris drive stepping motor (not depicted) which is rotated by a predetermined rotation angle according to a zoom drive pulse signal 53a supplied from the zoom lens control interface 4 and an iris adjustment mechanism (not depicted) for adjusting an iris (stop) amount according to the rotation output of this focus drive stepping motor.

The zoom position detection block 54 detects the zoom position which has been adjusted by the aforementioned zoom operation mechanism 51 and outputs a zoom position signal 54a indicating this zoom position, to the pulse width modulation block 46 of the zoom lens control interface 4.

The focus position detection block 55 detects the focus position which has been adjusted by the aforementioned focus operation mechanism 52 and outputs a focus position signal 55a indicating this focus position, to the pulse width modulation block 46 of the zoom lens control interface 4.

As has been described above, the camera body 5 includes an image pickup element such as a CCD and an image processing circuit for processing an image detected by this image pickup element, and generates a pickup signal Sv according to the pickup image. This pickup signal Sv is supplied via a coaxial cable or the like, to the camera control unit 140. The camera control unit 140 can control the display of a monitor image on a display unit (not depicted) and recording of the pickup signal Sv in a VTR apparatus.

The zoom control A/D conversion block 41 of the zoom lens control interface 4 detects the polarity and voltage of the zoom DC motor drive voltage signal 140a supplied in a range of ±12 volts from the camera control unit 140 and converts them into digital signals so as to generate and output a zoom control voltage signal 41a.

Similarly, the focus control A/D conversion block 42 detects the polarity and voltage of the zoom DC motor drive voltage signal 140b supplied in a range of ±12 volts from the camera control unit 140 and converts them into digital signals so as to generate and output a focus control voltage signal 42a.

Moreover, similarly, the iris control A/D conversion block 43 detects the polarity and voltage of the iris DC motor drive voltage signal 140c supplied in a range of ±12 volts from the camera control unit 140 and converts them into digital signals so as to generate and output an iris control voltage signal 43a.

Figure 4:
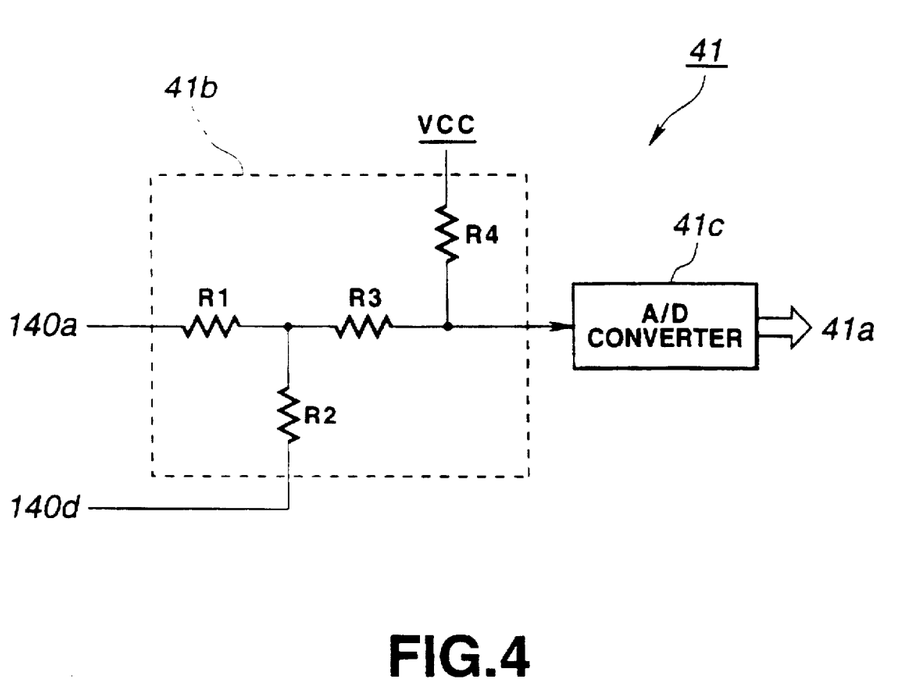
FIG. 4 shows an example of a circuit configuration of a zoom control A/D conversion block.

Description will now be directed to an example of the zoom control A/D conversion block 41 with reference to FIG. 4

As shown in FIG. 4 for example, the zoom control A/D conversion block 41 includes: a voltage conversion circuit 41b consisting of resistors R1, R2, R3, and R4; a DC power source VCC for applying a constant voltage to the resistor R4 of this voltage conversion circuit 41b; and an A/D converter 41c connected to the voltage conversion circuit 41b. Here, the A/D converter 41c used is to be supplied with an input voltage of a range from +0 to +3 volts.

On the other hand, the voltage conversion circuit 41b serves to convert into the input range of +0 to +3 volts of the A/D converter 41c the voltage of the zoom DC motor drive voltage signal 140a supplied in a range of ±12 volts from the camera control unit 140.

The aforementioned voltage conversion circuit 41b of the zoom control A/D conversion block 41 is set for a current in the order of several tens of milliamperes, so as to be compatible with a current used by the zoom DC motor 121 of the zoom lens block 120 in the conventional camera unit 110 shown in FIG. 1. That is, in the voltage conversion circuit 41b, resistor R1 and the resistor R2 are set so as to have a series composite resistance value which is almost equivalent to the series resistance value of the conventional zoom DC motor 121.

Moreover, in the voltage conversion circuit 41b, in order to accurately divide the zoom DC motor drive voltage signal 140a which will be explained later, the resistors R3 and R4 are set to a sufficiently high value which is about 100 times more than the resistance of the resistors R1 and R2.

The DC power source VCC supplies the resistor R4 of the voltage conversion circuit 41b with a constant voltage, i.e., +3 volts which is the maximum input voltage of the A/D converter 41c.

In the camera apparatus 3, +1.5 volts which is half (½ VCC) of the voltage supplied from the DC power source VCC is used as a center voltage. When this center voltage is supplied to the A/D converter 41c, the stepping motor is in a non-operation state. Moreover, in the camera apparatus 3, the stepping motor operation is reversed depending on whether the voltage supplied to the A/D converter 41c is above the center voltage of +1.5 volts.

In the image pickup system 1, the camera control unit 140 supplies the aforementioned zoom control A/D converter block 41 with the zoom DC motor drive voltage signal 140a having the positive or negative polarity in the aforementioned range of ±12 volts. This zoom DC motor drive voltage signal 140a is supplied to the resistor R1 of the aforementioned voltage conversion circuit 41b, so as to be divided into the resistor R1 and to the resistor R2.

In the voltage conversion circuit 41b, the voltage which has been divided by the resistor R1 and the resistor R2 are added to the +3 volt voltage of the DC power source VCC by the resistor R3 and the resistor R4, so as to supply a voltage of the positive polarity to the A/D converter 41c.

Thus, in the zoom control A/D conversion block 41, the zoom DC motor drive voltage signal 140a in the range of ±12 volts at maximum is divided so as to obtain a partial signal of ±3 volts, which is shifted by +3 volts with the DC power source VCC, so as to supply a voltage signal of a range from +0 to +3 volts to the A/D converter 41c of a single power source operation type.

It should be noted that in the zoom control voltage conversion block 41, instead of using the resistor R3 and the resistor R4, it is possible to use a voltage level converting circuit for converting partial voltages having the positive and negative polarity into a range of positive polarity for supply to the A/D converter 41c.

The A/D converter 41c converts the voltage signal of the aforementioned range from +0 to +3 volts into a digital signal so as to generate the zoom control voltage signal 41a.

Note that the focus control A/D conversion block 42 and the iris control A/D conversion block 43 respectively have a configuration similar to the zoom control A/D conversion block 41. Consequently, explanation on the focus control A/D conversion block 42 and the iris control A/D conversion block 43 will be omitted.

Moreover, each of the A/D conversion blocks 41, 42, and 43, instead of detecting the voltage value of the DC motor drive voltage signal 140a via the aforementioned divider circuit 41b, may use two pairs of photo couplers, each detecting a current of positive and reverse direction and outputting a control voltage signal according to the direction and value of the motor drive current detected via the photo couplers.

Figure 5:
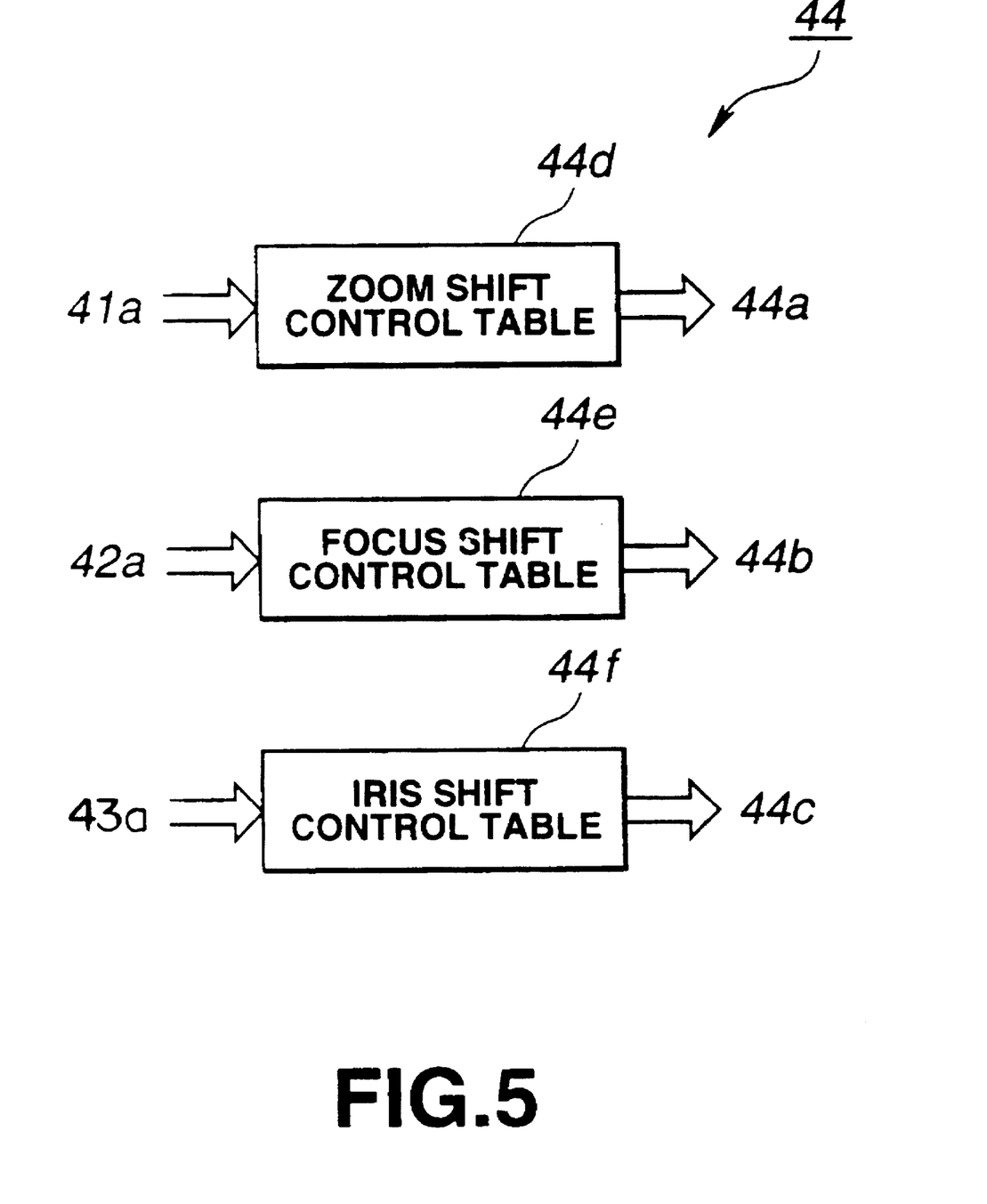
FIG. 5 is a block diagram showing an example of a shifting direction/velocity calculation block.

Description will now be directed to an example of the shift direction/velocity calculation block 44 with reference to FIG. 5. As shown in FIG. 5 for example, the shift direction/velocity calculation block 44 includes: a zoom shift control table 44d; a focus shift control table 44e; and an iris shift control table 44f. The zoom shift control table 44d contains data on the zoom shift direction and velocity corresponding to the respective voltage values specified by the zoom control voltage signal 41a.

Here, as has been described above, the zoom DC motor drive voltage signal 140a outputted from the camera control unit 140 indicates to shift the zoom position in the TELE direction if the signal has positive polarity (or negative polarity) and in the WIDE direction if the signal has negative polarity (or positive polarity). The voltage value of the zoom DC motor drive voltage signal 140a indicates the shift velocity of the zoom position. In the zoom lens block 120 in the conventional camera unit shown in FIG. 1, the zoom position shift velocity is increased as the zoom DC motor drive voltage signal 140a increases its voltage.

Consequently, the zoom shift control table 44d of the shift direction/velocity calculation block 44 contains data on the zoom shift direction and velocity corresponding to the respective voltages specified by the zoom control voltage signal 41a, so as to obtain an operation identical to the operation of the conventional lens operation block. Note that the focus shift control table 44e and the iris shift control table 44f also contain data on the shift direction and velocity, so as to obtain operations identical to the conventional focus operation and the iris operation.

The shift direction/velocity calculation block calculates the zoom position shift direction and shift velocity according to the zoom control voltage signal 41a and, according to the calculation result, outputs zoom shift direction/velocity data 44a. Moreover, the shift direction/velocity calculation block 44 calculates the focus position shift direction and velocity according to the focus control voltage signal 42a and, according to the calculation result, outputs a focus shift direction/velocity data 44b. Furthermore, the shift direction/velocity calculation block 44 calculates the iris position shift direction and velocity according to the iris control voltage signal 43a and, according to the calculation result, outputs an iris shift direction/velocity data 44c.

The shift direction and velocity calculation in the shift direction/velocity calculation block 44 is carried out as follows. That is, the shift direction/velocity calculation block 44, for example, calculates how much the zoom control voltage signal 41a is apart from the aforementioned center voltage of +1.5 volts and calculates the velocity required of the aforementioned zoom drive stepping motor in the positive direction or the reverse direction.

For example, in a case when the zoom control voltage signal 41a is a signal indicating +3 volts, i.e., when the zoom control voltage signal 41a is apart from the center voltage +1.5 volts by the maximum value in the plus direction, the shift direction/velocity calculation block 44 carries out a calculation to obtain a value which drives the zoom drive stepping motor in the TELE direction at the maximum velocity.

On the other hand, in a case when the zoom control voltage signal 41a is a signal indicating +1.5 volts, i.e., when the zoom control voltage signal 41a is at the aforementioned center voltage, the shift direction/velocity calculation block 44 carries out a calculation to obtain a value which stops the stepping motor.

Furthermore, in a case when the zoom control voltage signal 41a is a signal indicating +1.0 volt, i.e., when the zoom control voltage signal 41a is slightly apart from the center voltage of +1.5 volts in the minus direction, the shift direction/velocity calculation block 44 carries out a calculation to obtain a value which moves the zoom drive stepping motor in the WIDE direction at an intermediate velocity.

Figure 3:
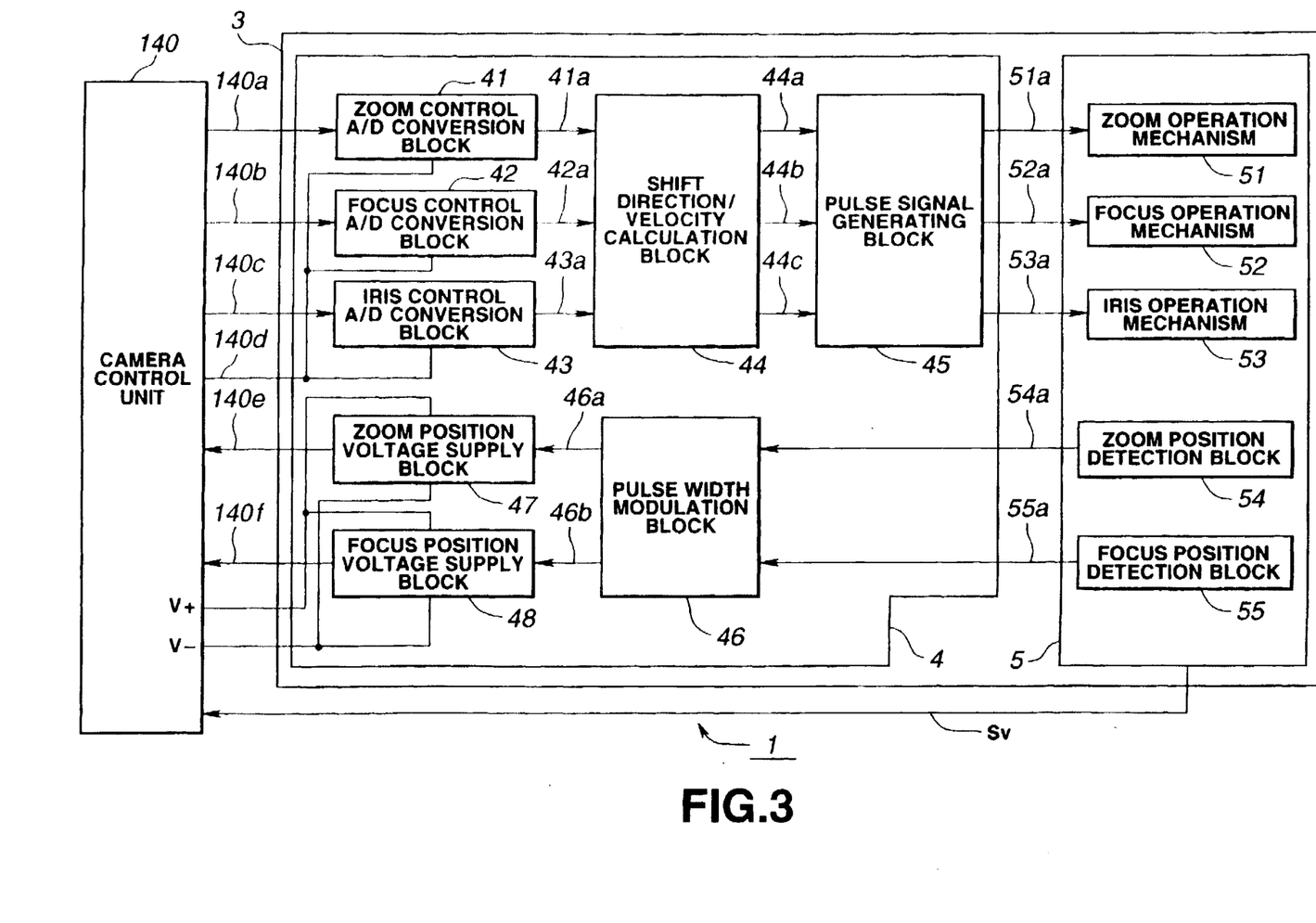
FIG. 3 is a block diagram showing a camera apparatus according to an embodiment of the present invention.

According to the zoom shift direction/velocity data 44a, the pulse signal generation block 45 generates and outputs a zoom drive pulse signal 51a for driving the zoom drive stepping motor. Moreover, according to the focus shift direction/velocity data 44b, the pulse signal generation block 45 generates and outputs a focus drive pulse signal 52a for driving the focus drive stepping motor. Furthermore, according to the iris shift direction/velocity data 44c, the pulse signal generation block 45 generates and outputs an iris drive pulse signal 53a for driving the iris drive stepping motor.

The pulse signal generation block 45, according to the aforementioned shift direction data, determines the rotation direction of the stepping motor, and according to the aforementioned shift velocity data, determines the pulse generation interval (the number of pulses generated per a unit time), so as to generate and output the respective stepping motor drive pulse signals 51a, 52a, and 53a.

Thus, in the image pickup system 1, according to the DC motor drive voltage signals 140a, 140b, and 140c supplied from the camera control unit 140, the respective stepping motors of the camera apparatus 3 are driven for remote control of the zoom position, focus position, and iris amount.

That is, with the configuration as has thus far been described, the camera apparatus 3 is connected to a camera control unit which outputs a control signal based on a DC voltage, thus enabling to control the camera apparatus 3. Consequently, in the camera apparatus 3, the existing conventional facilities can be utilized as they are. For example, in a monitor image pickup system, it is possible to replace a DC motor driven camera apparatus with a stepping motor drive camera apparatus at reasonable costs without much trouble.

Description will now be directed to the zoom lens preset function in the camera apparatus 3.

The pulse width modulation block 46 of the camera apparatus 3 executes a pulse width modulation (PWM) to the respective position signals 54a and 55a from the aforementioned position detection blocks 54 and 55. That is, the pulse width modulation block 46, according to the zoom position signal 54a from the zoom position detection block 54, outputs a zoom position voltage generating pulse width modulation signal 46a having a pulse width which has been set corresponding to the zoom position. Moreover, the pulse width modulation block 46, according to the focus position signal 55a from the aforementioned focus position detection block 55, outputs a focus position voltage generating pulse width modulation signal 46b having a pulse width which has been set corresponding to the focus position.

The zoom position voltage supply block 47, according to the aforementioned zoom position voltage generating pulse width modulation signal 46a, switches the position detection voltage V+, V− supplied from the position detection power circuit of the camera control unit 140, and smoothes the switching output so as to output a DC voltage corresponding to the zoom position as a zoom position voltage signal 140e.

Moreover, the focus position voltage supply block 48, according to the aforementioned focus position voltage generating pulse width modulation signal 46b, switches the position detection voltage V+, V− supplied from the position detection power circuit of the camera control unit 140 and smoothes the switching output so as to output a DC voltage corresponding to the focus position as a focus position voltage signal 140f.

As shown in FIG. 3, the zoom position signal 54a outputted from the zoom position detection block 54 is supplied to the pulse width modulation block 46. The pulse width modulation block 46 outputs a zoom position voltage generating pulse width modulation signal 46a having a pulse width which is set according to the zoom position. The zoom position voltage generating pulse width modulation signal 46a is supplied to the zoom position voltage supply block 47. Hereinafter, an example of the zoom position voltage supply block 47 will be explained with reference to FIG. 6.

Figure 6:
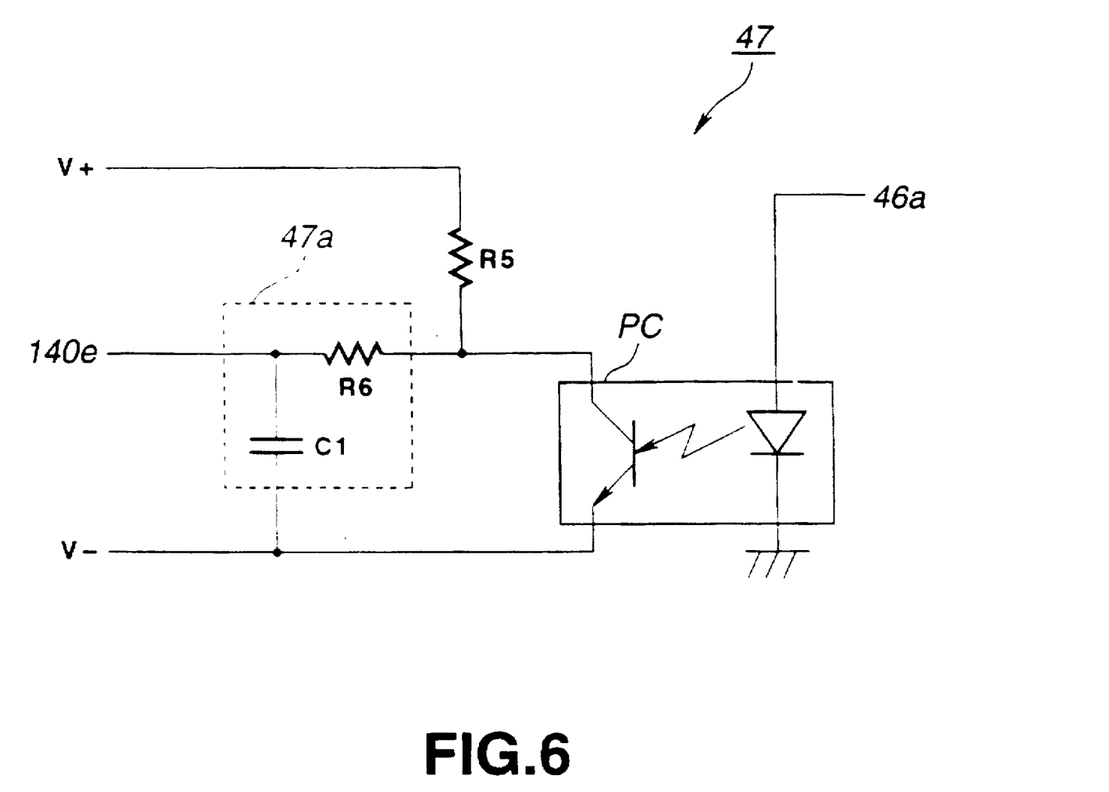
FIG. 6 shows an example of a circuit configuration of a zoom position voltage supply block.

As shown in FIG. 6 for example, the zoom position voltage supply block 47 includes a photo coupler PC and an integrating circuit 47a consisting of a resistor R6 and a capacitor C1. The photo coupler PC consists of a light emitting diode and a photo transistor. The light emitting diode has an anode connected to the pulse width modulation block 46 and a cathode connected to the ground. The photo transistor of the photo coupler PC has a collector connected via the resistor R5 to the position detection voltage V+ and an emitter connected to the position detection voltage V− of the camera control unit 140.

Moreover, the aforementioned integrating circuit 47a has one end connected between the resistor R5 and the collector of the photo transistor in the photo coupler PC and the other end connected to the position detection voltage V− of the camera control unit 140, enabling the output of a zoom position voltage signal 140e.

That is, with this configuration, in the zoom position voltage supply block 47, the zoom position voltage generating pulse width modulation signal 46a outputted from the pulse width modulation block 46 is supplied to the light-emitting diode of the photo coupler PC, which diode in turn emits a light corresponding to the pulse width of the pulse width modulation signal 46a, thus switching the photo transistor. With this operation, in the collector of the photo transistor is generated a signal of a pulse width set according to the zoom position having an amplitude identical to the position detection voltage V+, V−. This pulse signal is integrated and smoothed in the aforementioned integrating circuit 47a so as to output a DC voltage corresponding to the zoom position as a zoom position voltage signal 140e.

Here, the focus position voltage supply block 48 has a configuration similar to the zoom position voltage supply block 47 and accordingly, explanation of the focus position voltage supply block 48 will be omitted.

Figure 7:
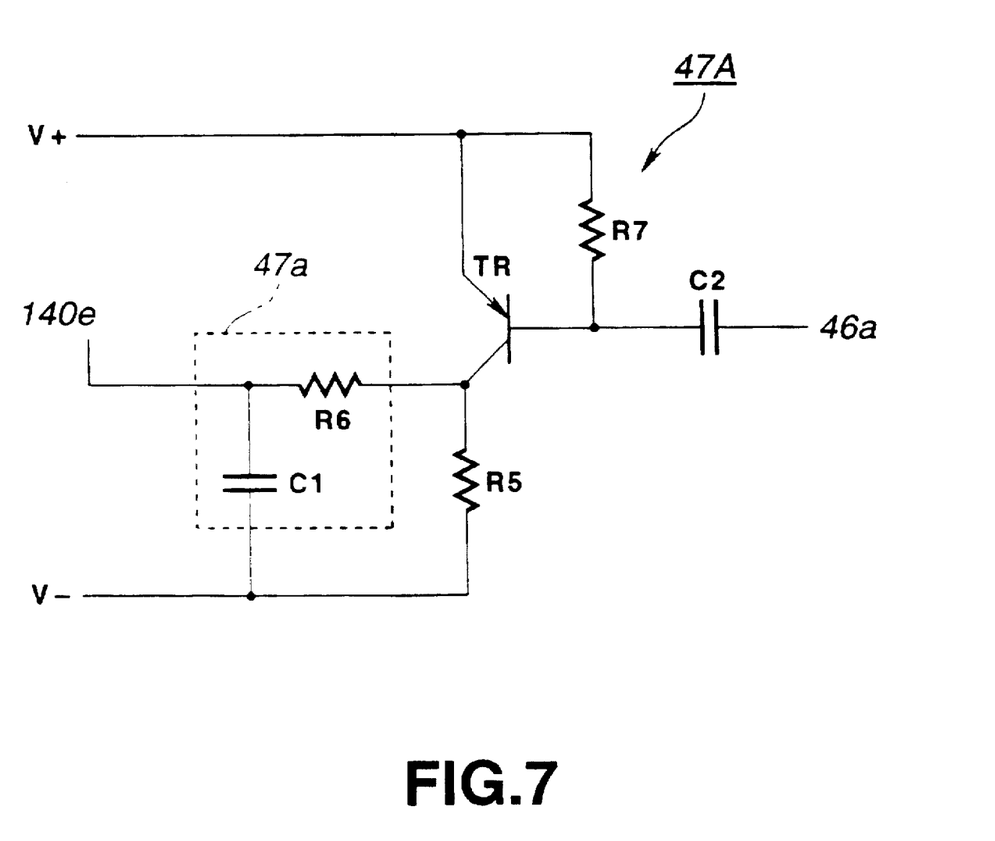
FIG. 7 shows another example of a circuit configuration of a zoom position voltage supply block.

It should be noted that the zoom position voltage supply block, as shown in FIG. 7, may have a configuration in which the photo coupler PC is replaced by a capacitor C2, a resistor R7, and a transistor TR which is switched. The zoom position voltage supply block 47A shown in FIG. 7 includes a switching circuit consisting of the aforementioned capacitor C2, resistor R7, transistor TR, and the resistor R5, and the aforementioned integrating circuit 47a. In the switching circuit of this zoom position voltage supply block 47A, the transistor TR has a base connected via the capacitor C2 to the pulse width modulation block 46, an emitter connected to the position detection voltage V+, and a collector connected to the integrating circuit 47a.

With this configuration, in the zoom position voltage supply block 47A, the zoom position voltage generating pulse width modulation signal 46a outputted from the pulse width modulation block 46 is supplied to the switching circuit so as to switch the transistor TR. With this operation, in the collector of the transistor TR is generated a pulse signal having a pulse width set corresponding to the zoom position and an amplitude identical to the position detection voltage V+, V−. This pulse signal is integrated and smoothed in the aforementioned integrating circuit 47a so that a DC voltage corresponding to the zoom position is outputted as a zoom position voltage signal 140e.

With this configuration, in the image pickup system 1, according to the position detection voltage V+, V− supplied from the camera control unit 140, a DC voltage corresponding to the zoom position is outputted externally as a zoom position voltage signal 140e. Moreover, it is possible to externally output a DC voltage corresponding to a focus position as a focus position voltage signal 140f. Consequently, in the camera apparatus 3, it is possible to carry out present operation of the zoom position and the focus position by utilizing the conventional camera control unit 140.

Figure 8:
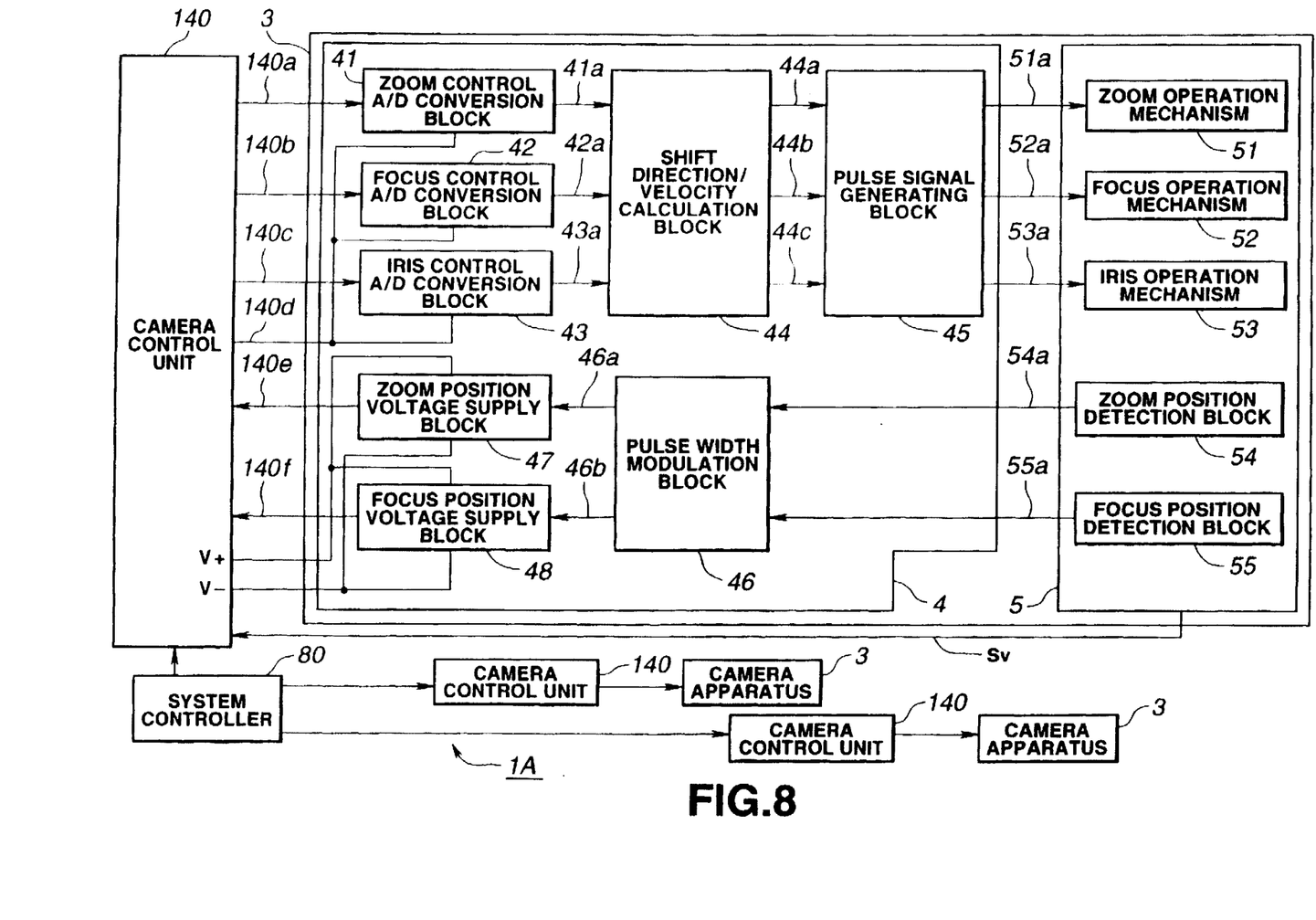
FIG. 8 is a block diagram showing an entire image pickup system for controlling from a system controller a plurality of camera apparatuses.

It should be noted that in the camera apparatus 3, as shown in FIG. 8, it is possible to provide a system controller 80, from which a plurality of camera apparatuses 3 are controlled through the camera control unit 140, thus obtaining an image pickup system 1A.

In the image pickup system 1A, the system controller 80 is connected to a plurality of camera control units 140, each of which is connected to a camera apparatus 3.

Moreover, in the image pickup system 1A, a serial communication apparatus such as RS-232C is provided between the system controller 80 and the camera control unit 140 so that the control block 142 of the camera control unit 140 shown in FIG. 2 is supplied by serial communication through the data serial communication apparatus with the zoom position instruction data, focus position instruction data, iris position instruction data, zoom position/focus position storage request data, and preset request data which are supplied from the system controller 80 to each of the camera apparatus 3. In this image pickup system 1A, for example, it is possible to control at one place a plurality of camera apparatuses 3 arranged at a plurality of locations within an area to be monitored.

Figure 9:
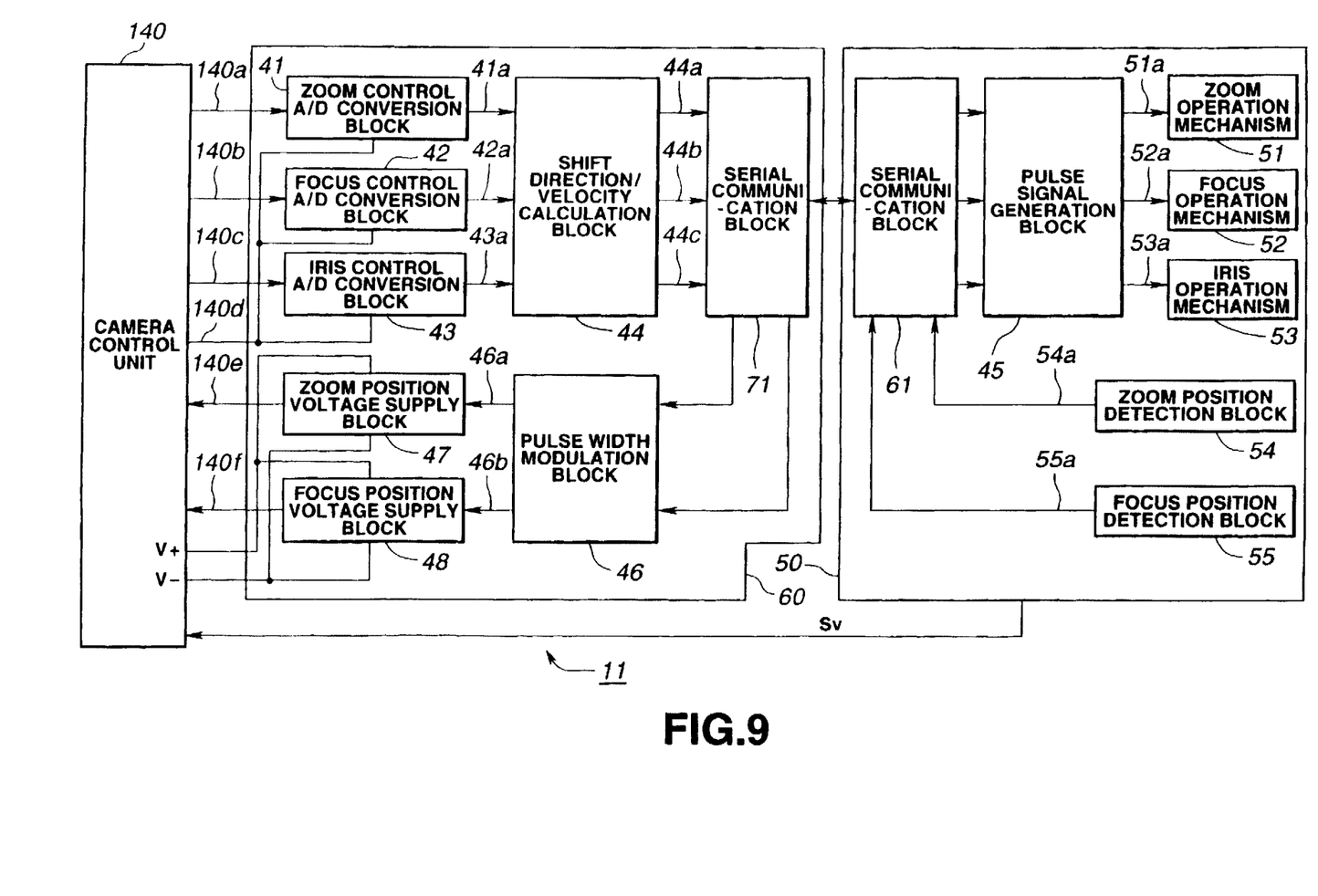
FIG. 9 is a block diagram showing a configuration of a lens control interface unit according to an embodiment of the present invention.

Description will now be directed to an embodiment of a lens control interface apparatus according to the present invention with reference to FIG. 9. Note that the same components as in the aforementioned embodiment are denoted with the same symbols and their explanations will be omitted.

An image pickup system 11 according to this embodiment, as shown in FIG. 9, includes: a camera control unit 140, a zoom lens control interface apparatus 60 having a serial communication function, and a video camera apparatus 50 having a serial communication function.

The video camera 50 has a built-in zoom lens using a stepping motor operated by a pulse signal, which is preferably used for guard duty. The video camera 50 includes the aforementioned zoom lens, a zoom operation mechanism 51, a focus operation mechanism 52, and an iris operation mechanism 53 for carrying out zoom, focus, and iris operations of the aforementioned zoom lens, respectively, and a zoom position detection block 54 and a focus position detection block 55 for detecting the zoom position and the focus position of the zoom lens, respectively. Moreover, this video camera apparatus 50 is provided with an image pickup element such as a CCD (not depicted) and an image processing circuit for processing an image detected by this image pickup element.

Furthermore, the video camera apparatus 50 is provided with a serial communication block 61 and a pulse signal generation block 45 which is connected to this serial communication block 61. That is, this camera apparatus 50 is equivalent to the camera body 5 of the camera apparatus 3 shown in FIG. 1 and FIG. 6, but additionally has the pulse signal generation block 45 and the serial communication block 61.

On the other hand, the zoom lens control interface apparatus 60 is a separate independent apparatus including: a zoom control A/D conversion block 41; a focus control A/D conversion block 42; an iris control A/D conversion block 43; a shift direction/velocity calculation block 44; a serial communication block 71 connected to this shift direction/velocity calculation block 44; a pulse width modulation block 46; a zoom position voltage supply block 47; and a focus position voltage supply block 48.

This zoom lens control interface apparatus 60 is equivalent to the zoom lens control interface 4 of the camera apparatus shown in FIG. 3 and FIG. 8, but without the pulse signal generation block 45, wherein the shift direction/velocity calculation block 44 and the pulse width modulation block 46 are connected to the serial communication block 71.

The serial communication block 61 of the video camera apparatus 50 is supplied by way of a serial communication such as RS232C, RS-422, RS-485 or the like, with zoom shift direction/velocity data 44a, focus shift direction/velocity data 44b, iris shift direction/velocity data 44c from the zoom control interface apparatus 60, and supplies this data to the pulse signal generation block 45. In the video camera apparatus 50, the zoom operation mechanism 51, the focus operation mechanism 52, and the iris operation mechanism 53 are operated via this pulse signal generation block 45.

Moreover, the serial communication block 61 converts into a serial signal the zoom position signal 54a and the focus position signal 55a detected by the zoom position detection block 54 and the focus position detection block 55, respectively, and outputs the serial signal to the zoom lens interface apparatus 60.

On the other hand, the serial communication block 71 of the zoom lens control interface apparatus 60 is supplied with zoom shift direction/velocity data 44a, focus shift direction/velocity data 44b, and iris shift direction/velocity data 44c which have been calculated by the shift direction/velocity calculation block 44, and converts the data into a serial signal for supply to the video camera apparatus 50.

Moreover, the serial communication block 71, upon reception of a serial signal relating to the zoom position signal 54a and the focus position signal 55a transmitted from the video camera apparatus 50, converts the serial signal into a parallel signal for supply to the pulse width modulation block.

In the image pickup system 11, the zoom lens control interface is an independent apparatus but in the same way as in the camera apparatus 3 in FIG. 3 and FIG. 8, when connected to the conventional camera control unit 140, it enables the control of the zoom, focus, and iris operations of the zoom lens of the camera body 60 and the carrying out of preset operations for the zoom and focus of the zoom lens according to the position detection voltage V+, V− from the camera control unit 140.

Note that in this image pickup system 11, in the same way as the image pickup system 1A shown in FIG. 8, it is possible to provide a system controller, and to control from this system controller a plurality of video camera apparatuses 50 via the camera control unit 140 and the zoom lens control interface apparatus 60. In such a configuration, for example, it is possible to control at a place a plurality of video camera apparatus 50 arranged at a plurality of locations within an area to be monitored.

As has thus far been described, the camera system according to the present invention includes: an A/D conversion block for converting a DC control signal ranging from positive to negative polarity into a digital signal; a shift direction/velocity calculation block for generating and outputting data on the lens shift direction and velocity according to the digital data from the A/D conversion block; and a pulse signal generation block for generating and outputting pulse signal according to the data from the shift direction/velocity calculation block, wherein the pulse signal from the pulse signal generation block is used to rotate the stepping motor of the lens mechanism for adjusting the lens position, enabling to be connected to and controlled by a camera control unit which outputs a control signal of a DC voltage.

Consequently, the camera system according to the present invention enables the utilization of the conventional existing facilities as they are, realizing the replacement of a DC motor driven camera apparatus with a stepping motor driven camera apparatus, for example, in an image pickup system for monitoring.

Moreover, the lens control interface apparatus according to the present invention includes: an A/D conversion block for converting a DC control signal ranging from positive to negative polarity into a digital signal; and a shift direction/velocity calculation block for generating and outputting data relating to the shift direction and velocity of the lens according to the digital signal from the A/D conversion block. When this lens control interface apparatus is connected to a camera control unit intended for a DC motor driven camera apparatus, the DC control signal from this camera control unit is converted by the A/D conversion block into a digital signal, which is used by the shift direction/velocity calculation block to output data on the lens shift direction and velocity.

Consequently, according to the lens control interface apparatus, it is possible to control the lens of a stepping motor driven type camera apparatus while utilizing the conventional existing facilities as they are.

What is claimed is:

1. A camera system comprising:

lens block means including a stepping motor supplied with a pulse signal and controlled according to a pulse width of said pulse signal for adjusting an internal operation in said lens block means;

signal level conversion means for converting a signal level of a DC analog control signal ranging from a positive polarity to a negative polarity into a predetermined signal level range;

A/D conversion means for converting into a digital signal said DC analog control signal of said predetermined signal level range output from said signal level conversion means;

control data calculation means for generating and for outputting control data of a control direction and a control velocity of said internal operation of said lens block means according to said digital signal output from said A/D conversion means; and pulse signal generation means for generating said pulse signal having said pulse width determined according to said control data output from said control data calculation means, and for supplying said pulse signal to said lens block means.

2. The camera system as set forth in claim 1, wherein said lens block means includes a zoom lens shifting mechanism controlled by said stepping motor driven according to said pulse signal.

3. The camera system as set forth in claim 1, wherein said lens block means includes a focus lens shifting mechanism controlled by said stepping motor driven according to said pulse signal.

4. The camera system as set forth in claim 1, wherein said lens block means includes an iris control mechanism controlled by said stepping motor driven according to said pulse signal.

5. The camera system as set forth in claim 1, said camera system further comprising:

operation position detection means for detecting an operation position in said lens block means;

pulse width modulation signal generation means for generating a pulse width modulation signal, wherein a pulse width of said pulse width modulation signal changes according to a detection result of said operation position detection means; and lens operation position voltage supply means for integrating said pulse width modulation signal and for outputting a DC voltage corresponding to an internal operation position of said lens block means.

6. The camera system as set forth in claim 5, wherein said lens block means includes a zoom lens shifting mechanism, and said lens operation position voltage supply means outputs said DC voltage representing a position of a zoom lens.

7. The camera system as set forth in claim 5, wherein said lens block means includes a focus lens shifting mechanism, and said lens operation position voltage supply means outputs said DC voltage representing a position of a focus lens.

8. The camera system as set forth in claim 5, wherein said lens block means includes an iris control mechanism, and said lens operation position voltage supply means outputs said DC voltage representing a position of an iris.

9. A camera lens block control unit for controlling a lens block having a stepping motor supplied with a pulse signal for adjusting an internal operation according to a pulse width of said pulse signal, said camera lens block control unit comprising:

A/D conversion means for converting an analog input signal of a predetermined signal level range into a digital signal;

control data calculation means for generating and for outputting control data of a control direction and a control velocity of said internal operation of said lens block, according to said digital signal output from said A/D conversion means;

pulse signal generation means for generating said pulse signal having said pulse width determined according to said control data output from said control data calculation means; and signal level conversion means for converting a signal level of said analog input signal ranging from a positive polarity to a negative polarity into said predetermined signal level range, wherein an output of said signal level conversion means is supplied to said A/D conversion means.

10. The camera lens block control unit as set forth in claim 9, wherein said lens block includes a zoom lens shifting mechanism controlled by said stepping motor driven according to said pulse signal.

11. The camera lens block control unit as set forth in claim 9, wherein said lens block includes a focus lens shifting mechanism controlled by said stepping motor driven according to said pulse signal.

12. The camera lens block control unit as set forth in claim 9, wherein said lens block includes an iris control mechanism controlled by said stepping motor driven according to said pulse signal.

13. The camera lens block control unit as set forth in claim 9, said camera lens block control unit further comprising:

operation position detection means for detecting an operation position in said lens block;

pulse width modulation signal generation means for generating a pulse width modulation signal, wherein a pulse width of said pulse width modulation signal changes according to a detection result of said operation position detection means; and lens operation position voltage supply means for integrating said pulse width modulation signal and for outputting a DC voltage corresponding to an internal operation position of said lens block.

14. The camera lens block control unit as set forth in claim 13, wherein said lens block includes a zoom lens shifting mechanism, and said lens operation position voltage supply means outputs said DC voltage representing a position of a zoom lens.

15. A camera lens block control unit as set forth in claim 13, wherein said lens block includes a focus lens shifting mechanism, and said lens operation position voltage supply means outputs said DC voltage representing a position of a focus lens.

16. The camera lens block control unit as set forth in claim 13, wherein said lens block includes an iris mechanism, and said lens operation position voltage supply means outputs said DC voltage representing a position of an iris.

* * * * *